United States Patent [19]

Brunner et al.

[11] Patent Number: 4,799,305

[45] Date of Patent: Jan. 24, 1989

[54] TUBE PROTECTION DEVICE

[75] Inventors: Michael G. Brunner, Penn Hills Township, Allegheny County; Gregory L. Calhoun, Allegheny Township, Armstrong County, both of Pa.

[73] Assignee: Westinghouse Electric Corp., Pittsburgh, Pa.

[21] Appl. No.: 23,947

[22] Filed: Mar. 10, 1987

Related U.S. Application Data

[63] Continuation of Ser. No. 686,805, Dec. 27, 1984, abandoned.

[51] Int. Cl.$^4$ .............................................. B23P 19/04
[52] U.S. Cl. ...................................... 29/265; 29/253; 29/280
[58] Field of Search ...................... 29/239, 244, , 253, 29/280, 281, 282, 263, 265; 138/97

[56] References Cited

U.S. PATENT DOCUMENTS

| | | |
|---|---|---|
| 1,335,117 | 3/1920 | Kofoed et al. . |
| 1,812,943 | 7/1931 | Granger . |
| 2,543,954 | 6/1951 | Barber . |
| 3,173,449 | 3/1965 | Custer et al. . |
| 3,493,333 | 3/1970 | Jones . |
| 3,507,028 | 4/1970 | Stellatella ........................ 29/280 X |
| 3,834,422 | 9/1974 | Larson ................................ 138/97 |
| 4,059,036 | 11/1977 | Hartley . |
| 4,104,775 | 8/1978 | Lawless ........................... 29/280 X |
| 4,114,654 | 9/1978 | Richardson . |
| 4,290,543 | 9/1981 | Larson . |
| 4,352,379 | 10/1983 | Larson . |

FOREIGN PATENT DOCUMENTS

| | | | |
|---|---|---|---|
| 1033940 | 7/1978 | Canada ................................ 29/282 |
| 0047407 | 3/1982 | European Pat. Off. . |
| 0120277 | 10/1984 | European Pat. Off. . |
| 58951 | 9/1891 | Fed. Rep. of Germany . |
| 428342 | 7/1967 | Switzerland ........................ 138/97 |
| 2084542 | 4/1982 | United Kingdom . |
| 2122300 | 1/1984 | United Kingdom ................. 138/97 |

*Primary Examiner*—P. W. Echols
*Assistant Examiner*—Joseph M. Gorski

[57] ABSTRACT

A tube protection device is positioned within a heat exchange tube of a nuclear steam generator to span a defect region and protect same against damage or deformation during withdrawal of the tube from the generator for subsequent defect analysis and testing. The tube protection device includes gripper means at the opposite ends thereof which are expansible from a relaxed condition permitting movement of the device through the tube to a clamped condition, releasably, frictionally engaging the contiguous interior sidewall surfaces of the tube at positions respectively spaced from the defect and spanning the defect region. An installation tool includes an elongaged linkage mechanism insertable through an open end of the tube for positioning the tube protection device and for operating same from the accessible portion of the linkage mechanism exterior to the open end of the tube between said relaxed and clamped conditions, and for remote withdrawal of the tube protection device from the tube.

8 Claims, 5 Drawing Sheets

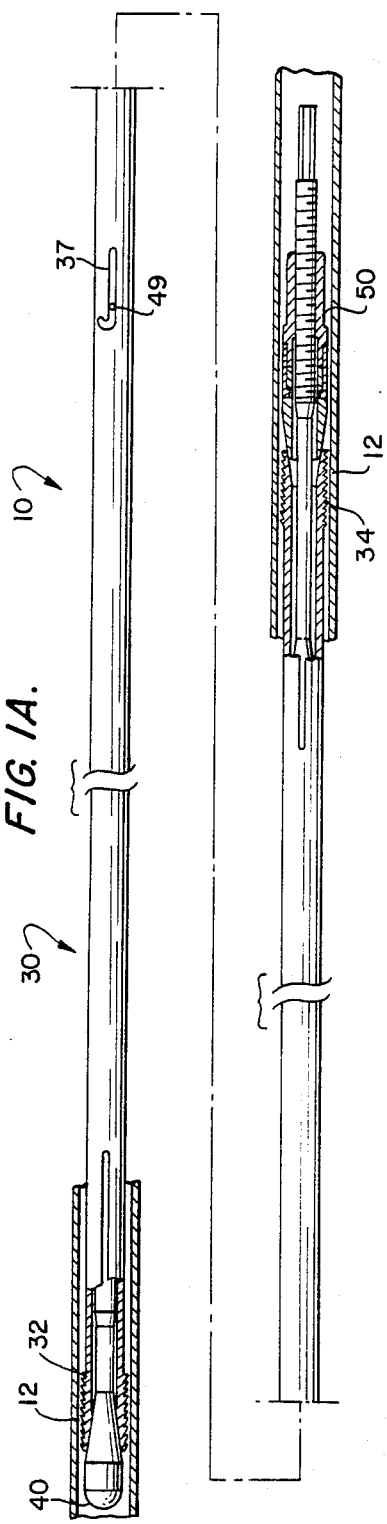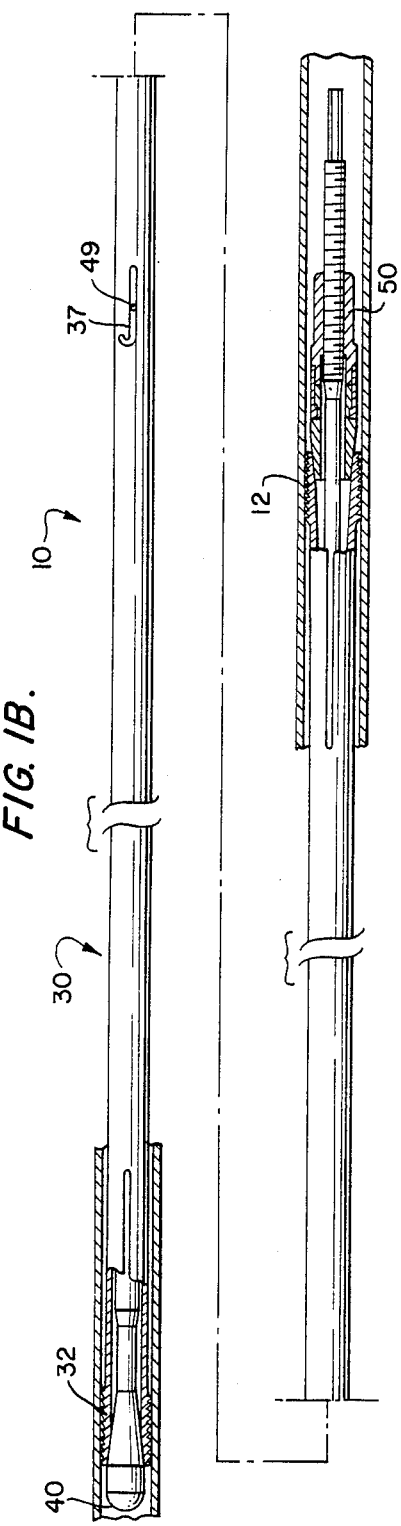

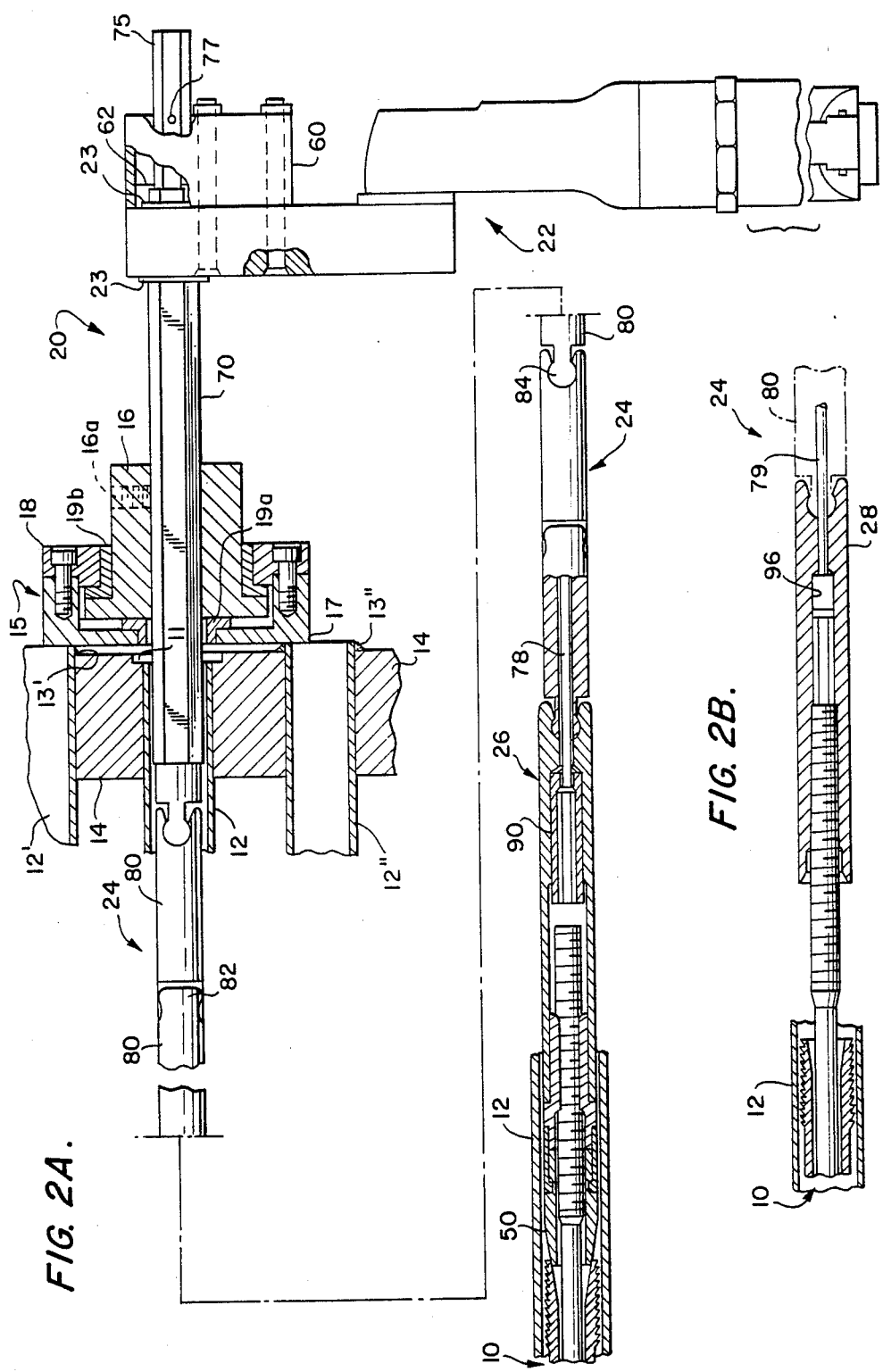

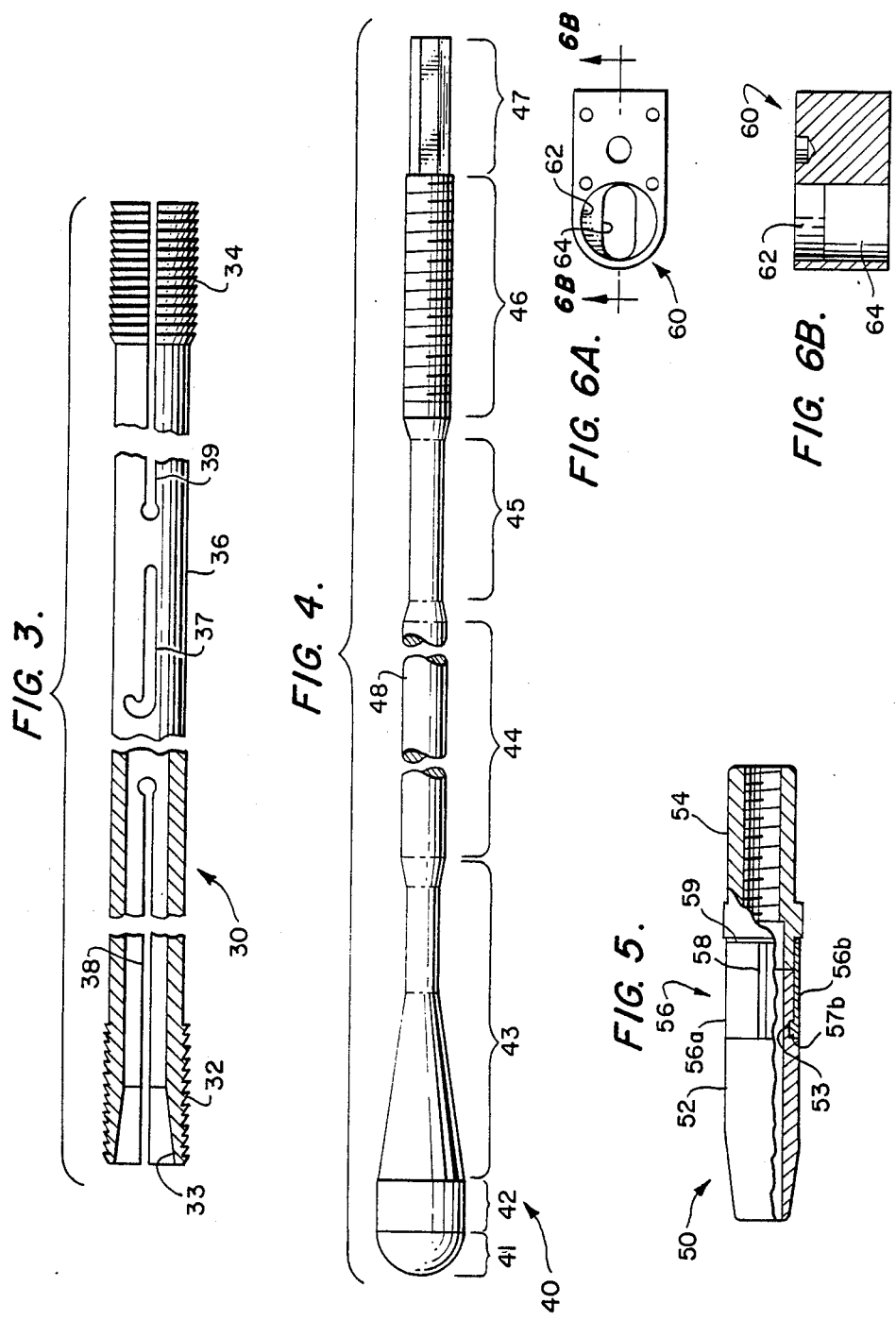

TUBE PROTECTION DEVICE

This application is a continuation, of application Ser. No. 06/686,805 filed Dec. 27, 1984 now abandoned.

CROSS REFERENCE TO RELATED APPLICATION

The invention disclosed and claimed herein is related to the invention disclosed and claimed in copending patent application Ser. No. 605,351—Fields et al., filed Apr. 30, 1984, now U.S. Pat. No. 4,571,802.

BACKGROUND OF THE INVENTION

1. Field of the Invention

This invention relates to a tube protection device and method for use in a nuclear steam generator and, more particularly to a device which protects defect regions of such a tube from being damaged or distorted during removal of the tube from the generator for subsequent defect analysis and testing.

2. State of the Prior Art

Tube-type heat exchangers, commonly referred to as steam generators, as employed in nuclear reactor power plants are well known in the art. U.S. Pat. No. 4,079,701 to Hickman et al. and U.S. Pat. No. 4,276,856 to Dent et al., assigned to Westinghouse Electric Corporation, the common assignee of this invention, is an example of such a steam generator. The development of defects in the heat exchanger tubes is also a well-known problem. The need to plug a heat exchange tube arises when a defect permitting a leak in such a tube develops, creating both an ineffective heat exchanger problem and, more seriously, a radioactive contamination problem. Particularly, a defect in a heat exchanger tube permits primary fluid, which recirculates through the tube and a nuclear power generator, to leak into the secondary fluid which surrounds the tubes; since the former is generally radioactive, the secondary fluid surrounding the tubes becomes comtaminated. U.S. Pat. No. 4,369,662, assigned to the common assignee herein, discloses a plug installation apparatus which is capable of quickly installing a plug in such a heat exchanger tube to render it inoperable, and of verifying proper installation of the plug.

Because of the seriousness of the problems presented by defects developing in steam generator tubes, it is also the practice in the art to remove tubes having such defects from the generator, to permit conducting defect analyses and testing, including destructive examination. Prior art techniques for removal of such tubes include placing a tapered, threaded mandrel into the end of the tube containing the defect, and then removing the tube using a hydraulic puller assembly which pulls on the mandrel and the tube. The force required to remove the tube, however, frequently imposes excessive loads on the tube causing the latter to elongate; since the defect region of the tube is typically the weakest part of the tube, the tube is prone to distortion and breakage in the defect region, thus destroying the defect region and precluding the intended examination and analyses. Previously, solutions to avoiding the problem of destroying the defect region during the pulling of the tube have been proposed wherein a device both pulls and protects the tube simultaneously; such prior art devices, however, have generally been limited to use with only a limited extent of the tube adjacent an open end thereof (e.g., the bottom three feet) and thus are incapable of protecting against destruction or distortion of defects in the tube located at positions remote from the open end.

SUMMARY OF THE INVENTION

The present invention comprises a tube protection device and an associated installation device which is employed to insert the tube protection device into a steam generator tube at any height, or position, of the tube at which a defect exists. The installation device also is used to release the tube protection device for withdrawal from the tube, and for pulling the device from the tube.

In use, the installation device first positions the tube protection device at the required tube location for spanning the defect. The installation device then is operated to cause two separate gripping portions of the tube protection device, located at its opposite ends, to expand and firmly engage the interior of the tube wall at positions displaced from the defect. The torque imposed by the installation device is limited so as to prevent the outside diameter of the tube from being expanded, or increasing, as the gripping portions of the tube protection device expand toward and engage the tube wall. The installation device then is removed from the tube. Thereafter, as is conventional, a tapered mandrel is threaded into the bottom of the tube; a hydraulic pulling assembly then engages the mandrel for transmitting the necessary force to withdraw the tube from the generator.

The tube protection device strengthens the tube section which it spans, so that if the force used to pull the tube exceeds the yield of the tube material, the tube elongates only in the areas of the tube not protected by the tube protection device of the invention. The tube protection device of the invention may be made to any desired length as may be required to span the defect region within the tube. One device may span more than one defect and multiple tube protection devices in accordance with the invention can be installed in the same tube, if necessary, so as to span corresponding, displaced defects in the tube.

BRIEF DESCRIPTION OF THE DRAWINGS

FIG. 1A is a plan view, partially broken and partially in cross-section, of the tube protection device of the invention positioned within a segment of a heat exchange tube, in a relaxed condition;

FIG. 1B is a plan view, partially broken and partially in cross-section, of the tube protection device of the invention positioned in a clamped condition within a segment of a heat exchange tube;

FIG. 2A is a elevational view, partially broken away and partially in cross-section, of an installation device used in accordance with the invention for positioning the tube protection device of the invention at a desired position within a tube, and adapted for operating the tube protection device between clamped and unclamped conditions within the tube;

FIG. 2B is an elevational view corresponding to that of FIG. 2A, illustrating the installation device of the invention as adapted for pulling a tube protection device from a remote segment of a heat exchange tube;

FIG. 3 is an elevational view, partially broken away and partially in cross-section, of a gripper portion of a tube protection device in accordance with the invention;

FIG. 4 is an elevational view, partially broken away, of a mandrel portion of the tube protection device of the invention;

FIG. 5 is an elevational view, partially in cross-section, of a wedge nut assembly associated with the mandrel of FIG. 4;

FIGS. 6A and 6B are plan and elevational, cross-sectional views of an adaptor element of the installation device of FIG. 2A;

DETAILED DESCRIPTION OF THE PREFERRED EMBODIMENT

Figure 7A:
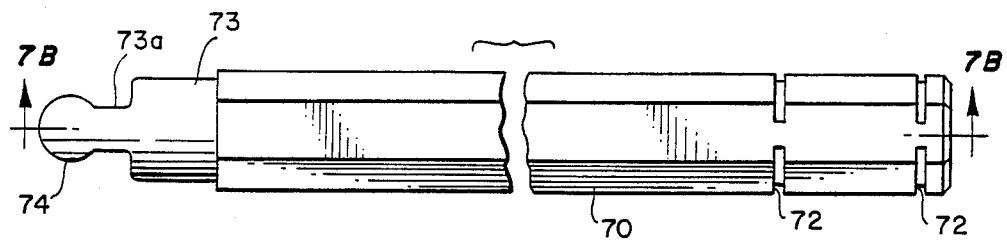
FIGS. 7A and 7B are elevational and cross-sectional views, respectively, of an end extension element comprising a part of the installation device of FIG. 2A.

The principal components of the invention comprise a tube protection device 10 and an installation tool 20, as generally disclosed in FIGS. 1A, 1B, 2A, and 2B. With concurrent reference thereto, a tube protection device 10 is inserted into a heat exchanger tube 12, as shown in cross-section in FIG. 1A, by the adjustable length link mechanism 24 of the installation tool 20, to the position required to span a defect (not shown) in the tube 12.

The tool 20 includes a power drive device 22 which connects to and operates through the adjustable length link mechanism 24 and a drive socket 26, as shown in FIG. 2A, for engaging a wedge assembly 50 carried by the device 10 both for initially inserting the device 10 to the required position within the tube 12 and then for driving same from the relaxed condition shown in FIG. 1A to the clamped condition shown in FIG. 1B. As will be described, this will be accomplished by driving the drive socket 26 in clockwise rotation through link mechanism 24 by the power drive device 22 (assuming a right-hand thread relationship of the involved components, as illustrated in the drawings). The tool 20 may then be withdrawn from the tube 12, leaving the device 10 in place in its clamped condition for protecting the defect region of the tube 12 as the latter is pulled from the steam generator.

As illustrated in FIG. 2A, the tube 12 typically is mounted in a tube sheet 14, through which it must be pulled in being withdrawn from the generator. As described more fully hereafter, a significant feature of the invention is that the tube protection device 10, in its clamped condition as shown in FIG. 1B, does not expand the outer diameter of the tube 12, thus assuring that the tube 12 may be pulled through the tight fitting aperture in the tube sheet 14 with the device 10 in place. Although elongation, and accompanying reduction in diameter, of the tube 12 may occur in the regions thereof which are not protected by the tube protection device 10 of the invention, such reduction in diameter which occurs in the portions of the tube 12 immediately adjacent the positions of engagement of the tube protection device 10 therewith in fact aid in achieving a tight grip of the device 10 with the contiguous, interior walls of the tube 12. The device 10 thus assures that the portion of the tube 12 which it spans is protected against elongation or other deformation, thereby to preserve the defect region for subsequent examination and analysis.

When it is desired to remove the tube protection device from a clamped condition at an establshed position within the tube 12—either for relocating same within the tube 12 due to an initial positioning error, or after the tube has been pulled and thus for complete removal of the device 10 to permit examination and analysis of the defect in tube 12—the drive socket 26 is driven in counterclockwise rotation through link mechanism 24 by the drive device 22, to retract the tube protection device 10 from the clamped condition to the original relaxed condition of FIG. 1A. The drive socket 26 is then replaced by the removal socket 28 which, in a manner to be described, is threaded onto the device 10 through link mechanism 24 and the power drive device 22, for secure engagement thereto. Thereafter, axial force is extended through link mechanism 24 to pull the device 10 from the tube 12. In those cases in which tube 12, after removal, can be cut at positions adjacent the ends of the tube protection device 10, the wedge assembly 50 is directly accessible, permitting a more convenient removal operation.

With concurrent reference to FIGS. 1A and 1B, 3, 4, and 5, the principal elements of the tool protection device 10 includes a gripper 30, a mandrel 40 and a wedge assembly 50. The gripper 30 is of generally cylindrical configuration and annular cross-section, and includes identical end portions 32 and 34 having sharp teeth on the outer surfaces thereof. The end poritions 32 and 34 have tapered interior walls defining an interior, or female, frustoconical receiving surface 33, extending inwardly approximately one-half the axial length of the respective end portions 32 and 34, as seen in the cross-sectional view of end portion 32 in FIG. 3. The central portion 36 of gripper 10, intermediate the end portions 32 and 34 thereof, is of generally cylindrical cross-section and includes centrally disposed L-shaped slots 37 on opposite (i.e., 180° separated, or diametrically opposed) sides thereof, only one of which is visible in FIGS. 1A, 1B, and 3. The longer dimension of the L-shaped slot 37 extends in a parallel axial direction and the shorter leg extends circumferentially of the central, cylindrical portion 36. A set of four, 90°-spaced (i.e., quadrature-related) elongated slots 38 extend in parallel-axial relation from the central portion 36 through end portion 32; a corresponding set of four slots 39 are provided at the opposite end of the gripper 30. (Only one slot of each of the sets 38 and 39 is visible in FIG. 3.).

As will be described, by axially advancing the wedge assembly 50 along the mandrel 40 and thus contracting the relative spacing of the head of mandrel 40 and the wedge assembly 50, the end portions 32 and 34 of the gripper 30 are caused to expand and engage the interior walls of the tube 12, the sharp teeth on the outer surfaces of the end portions 32 and 34 securely gripping the interior wall surfaces of the tube 12 at positions displaced from the defect in the tube 12, with the central portion 36 of the gripper 30 spanning the defect. As will be appreciated, the axial length of gripper 30 may be selected as desired, so as to afford the necessary spanning distance. The sets of slots 38 and 39 are of sufficient axial length so as to permit the radial expansion of the end portions 32 and 34 without creating unacceptable stresses in, or permanent deformation of, any portion of the gripper 30 when the end portions 32 and 34 are so expanded.

The mandrel 40, shown in FIG. 4, includes a head comprising a hemispherical end surface 41, an adjacent, generally cylindrical portion 42 and a tapered portion 43 having a male frustoconical surface mating that of the female, or interior, frustoconical receiving surfaces 33 of the end portions 32 and 34 of gripper 30. The tapered portion 43 at its smallest diameter blends through a radius, a reduced diameter cylindrical portion, and a further radius to merge with a central, cylindrical section 44 which in turn blends through a radius to join a reduced diameter cylindrical portion 45 which in turn blends through a radius to join a threaded portion 46 of cylindrical cross-section, the latter in turn connecting integrally to end portion 47 having a hexagonal cross-section, or outer surface.

With reference to FIGS. 1A, 1B, 3 and 4, the tube protection device 10 is assembled by inserting the mandrel 40 without the gripper 30; a pair of diametrically opposed, radially oriented holes 48 located at an intermediate position of the cylindrical portion 44 of the mandrel 40 are aligned with the L-shaped slots 37 and a corresponding pair of pins 49 then are force fit into the holes 48 to maintain the gripper 30 and mandrel 40 together in limited rotational and axial sliding relationship, for purposes hereinafter described.

The wedge assembly 50, as seen in FIG. 5, includes three elements, namely, a wedge 52, a wedge nut 54, and a collar 56. The collar 56 is formed in two semi-cylindrical parts 56a and 56b, which are assembled onto wedge 52 with the respective, inward radial lips thereof (as shown at 57b for part 56b) received in the annual recess 53 in wedge 52. The parts 56a and 5b then are welded together along their respective, common longitudinal edges, as shown by weld bead 58, and are welded at their respective lower peripheral edges to the wedge nut 54, as shown by weld bead 59. Collar 56 and wedge nut 54 thus are made integral, and are locked together with, but are free to rotate relatively to, wedge 52. Wedge 52 is tapered at its outer end to define a male frustoconical surface corresponding to the female, or interior, frustoconical surfaces 33 of the end portions 32 and 34 of the gripper 30. Wedge nut 54 is interiorally threaded so as to be received in threaded engagement on the threaded portion 46 of the mandrel 40. The exterior surface of wedge nut 54 is formed to have a hexagonal outer surface by which it may be driven in rotation, thereby to axially advance along the threaded portion 46 of mandrel 40. Thus, when the mandrel 40 and gripper 30 are assembled as in FIG. 1A, rotation of the wedge nut 54 will cause the respective male frustoconical surfaces of tapered portion 43 of mandrel 40 and of wedge 52 to move, simultaneously, axially inwardly, imposing a radially outward force against the mating female frustoconical surfaces 33 of gripper end portions 32 and 34 and causing the latter to expand radially outwardly and move from the relaxed condition illustrated in FIG. 1A to the clamped condition illustrated in FIG. 1B. The toothed outer surfaces of end portions 32 and 34 thus are caused to be driven toward and securely engage the interior side walls of the tube 12.

The installation tool 20 may comprise a commercially available power drive device 22, such as a Stanley crowfoot nut setter, with which a specially configured adaptor 60 is employed; adaptor 60 is shown in more detail in the plan view of FIG. 6A and the cross-sectional elevational view of FIG. 6B. The power drive device 22 and adaptor 60 functions in cooperation with an end piece 70 and an end extension 75, and through the link mechanism 24, to operate the device 10 between its relaxed and clamped conditions. The adaptor 60 includes a cylindrical bore 62 extending therethrough approximately one-fourth of the thickness dimension thereof and an elongated slot 64 which extends as an aperture through the remainder of that same thickness dimension along the common axis of bore 62. Suitable screw holes are provided through the adaptor 60 for screw-mounting same to the power drive device 22, as best seen in FIG. 2A. The end extension 75 is of generally cylindrical configuration and has a hexagonal, or hex-nut outer surface (i.e., a hexagonal cross-section) throughout its length such that diametrically opposite, planar flats of the hexagonal outer surface are engaged by the parallel flat surfaces of the slot 64 to prevent rotation of the end extension 75 when inserted therein. End extension 75 includes an axial bore throughout the length thereof for receiving a stabilizing wire 78 and a radial bore in the side wall for receiving a set screw 77; as will be described, the stabilizing wire 78 is inserted through a central, or axial bore which extends throughout all of the elements of link mechanism 24 for interconnecting the drive socket 26 with the end extension 75, the set screw 77 clamping the wire 78 within the end extension 75. As will be further explained, in the case of the removal socket 28, a corresponding wire 79 similarly interconnects the removal socket 28 with the end extension 75.

Figure 7B:
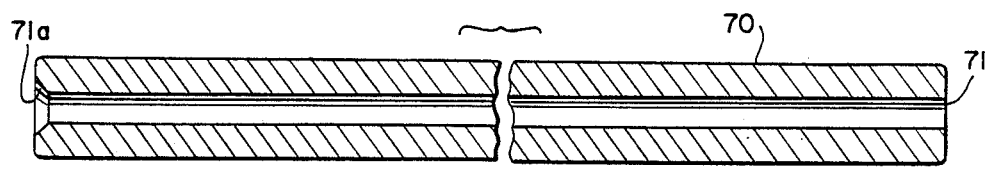

End piece 70 is shown in more detail in the plan view of FIG. 7A and in the cross-sectional view of FIG. 7B, the latter taken along line 7B—7B in FIG. 7A. Axial bore 71 seen in FIG. 7B is provided for receiving the wire 78 or 79, above referenced. The majority of the axial length of end piece 79 has a hex-nut surface, (i.e., hexagonal cross-section), a pair of spaced, retaining ring slots 72 being provided adjacent the free end thereof. The end piece 70 further includes an end portion 73 having a cylindrical cross-section, preferably of the same diameter as the spacing between the flats of the hexagonal cross-section portion, a neck portion 73a and an integral, male cylindrical joint element 74; the axis of the cylindrical joint element 74 extends transversely of the axis of the end piece 70, as will be appreciated from a comparison of the views of FIG. 7A and 7B. The axial bore 71 is counter-bored to afford a flared opening 71a in the male cylindrical joint element 74, for a reason to be explained.

With reference to FIG. 2A, the end piece 70 is received at the free end of its hexagonal-surface portion through a suitable drive-engaging fixture in the power drive element 22 and held in position against axial displacement therefrom by retaining rings 23 received in the slots 72, the free end thereof extending into the cylindrical bore 62 of the adaptor 60 for free rotation therein.

Figure 8A:
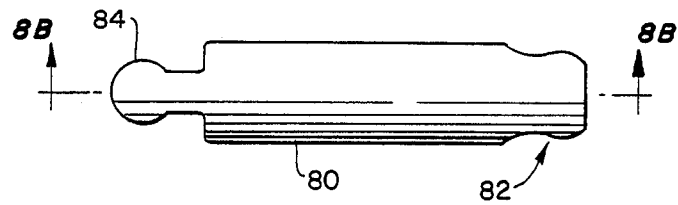
FIGS. 8A and 8B are elevational and cross-sectional views, respectively, of a link comprising a part of the installation device of FIG. 2A.
Figure 8B:
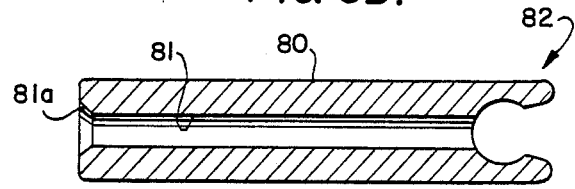

A plurality of links 80 interconnect the end piece 70 with, selectively, the drive socket 26 or the removal socket 28, shown in FIGS. 2A and 2B, respectively, a single one of which links 80 is shown in plan and cross-sectional views in FIGS. 8A and 8B, respectively. Link 80 is of generally cylindrical cross-section and includes a female cylindrical socket element 82 at one end thereof and a male cylindrical joint element 84 at the opposite end thereof. Link 80 furthermore includes a central, axial bore 81 having a flared opening 81a at the end thereof defined by the male cylindrical joint element 84.

Figure 9:
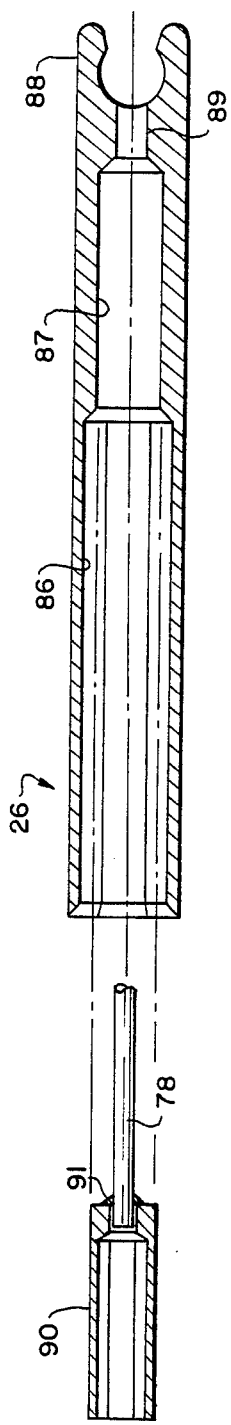
FIG. 9 is an exploded, cross-sectional view of a drive socket assembl comprising a part of the installation device of FIG. 2A.

The drive socket 26 of FIG. 2A, shown in more detail in the exploded, partially cross-sectional view of FIG. 9, comprises a female hexagonal drive socket 86, an inner, female holding socket 87, and a female cylindrical socket element 88, the latter receiving, in a slide-fit connection, the male cylindrical joint element 84 of a next adjacent first link 80 of the link mechanism 24. The axial and diametric dimensions of the inner, female holding socket 27 are proportioned to receive therein an inner holding element 90, for relatively free rotation therewithin. The inner holding element 90 furthermore includes a reduced diameter central bore 91 for receiving a terminal end of a stabilizing wire 78, which is secured thereto such as by weld bead 91. The drive socket 86 is suitably dimensioned to be received over the hexagonal surface of wedge nut 54, shown in FIG. 5.

When the drive socket 26 is assembled, as illustrated in FIG. 2A, the holding element 90 is received within the inner, female holding socket 87, the wire 78 extending through the central bore 89 therein and emerging through the female cylindrical socket element 88 and thereafter extending into the cylindrical male joint element 84 of the adjacent link 80, and through the corresponding bores 81 in each successive link element 80, central bore 71 of the end portion 70 and the central bore (not shown) of the end extension 75 wherein it is secured by set screw 77. The successive links 80 are assembled in succession and the wire 78 fed therethrough, to achieve the required length of link mechanism 24. It thus will be seen that the power drive device 22 can drive the end piece 70 in rotation while the end extension 75, secured against rotation by adaptor 60, holds the wire 78 securely therein by the set screw 77 and prevents any significant rotational movement of the wire 78 throughout its length. Thus, inner holding socket 90 is restrained against rotation by wire 78 and holds mandrel 40 relatively non-rotational while link mechanism 24, driven by power drive device 22, rotates the drive socket 26. The outer drive socket 86, engaged over wedge nut 50, thereby rotates same, advancing wedge nuts 52 along and relatively to the mandrel 40; this causes the head of the mandrel 40 and wedge nut 52 to move axially toward each other, relative to the end portions 32 and 34 of the gripper 30, and causes the latter to move from the relaxed condition thereof shown in FIG. 1A to the clamped condition thereof shown in FIG. 1B. The device 22, as is conventional, applies a limited, maximum torque, selected by pre-calibration for the material and thickness of any given tube 12, so as not to alter the outer surface of tube 10 in the clamped condition of gripper 30. It will be appreciated that the cylindrical joints permit pivotal movement of adjacent links 80 about an axis transverse to the central axis of each link 80, the flared ends 71a and 81a affording clearance for the wire 78. Moreover, since the male element 84 is offset by 90° from the female element 82 in each link 80, each grouping of four (4) links 80 affords 360° of limited pivotal freedom in 90° increments; if desired, smaller angular offsets of the male and female elements 84 and 82 in each link 80 may be employed, in conjunction with shorter axial lengths of individual links 80, to achieve an even greater number of incremental degrees of freedom in a given length of the link mechanism 24.

As before noted, the installation tool 20 may also be employed to release a tube protection device 10 from the clamped condition of FIG. 1B to the relaxed condition of FIG. 1A, by opposite rotation of the drive socket 26, whereby the wedge assembly 50 is released from the mandrel 40 and removed from the tube 12. The end portions 32 and 34 of the gripper 30 thus contract radially inwardly, disengaging their toothed surfaces from the inner wall surfaces of tube 12 and releasing the device 10 for movement relative to the tube 12. Thereafter, the device 10 may be removed, employing the removal socket 28 on the link mechanism 24.

Figure 10:
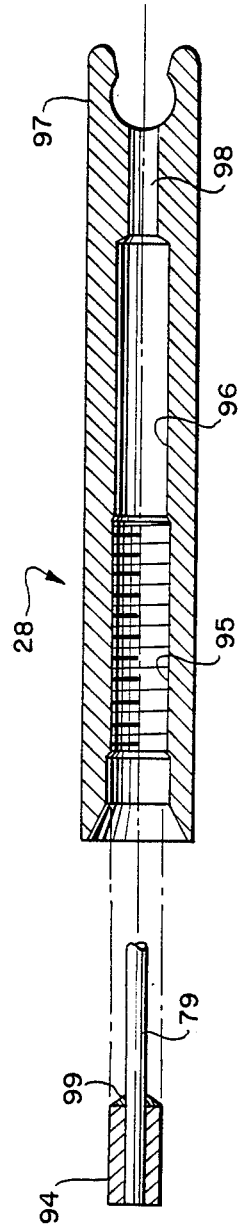
FIG. 10 is an exploded, cross-sectional view of a removal socket employed with the installation device of FIG. 2B.

The removal socket 28 of FIG. 2B is shown in more detail in the cross-sectional view of FIG. 10. With concurrent reference to FIGS. 2B and 10, the removal socket 28 includes a female threaded socket 95, a reduced diameter holding socket 96, and a female cylindrical socket element 97, an axial bore 98 extending through the latter. Stabilizing wire 79 is received through the axial bore 98 and is secured at its free end to a cylindrical stop piece 94. Wire 79 is received in an axial bore in stop piece 94 and secured thereto, such as by a weld bead 99. In use, the wire 79 is inserted through the sockets 95 and 96 and the bore 98 in the removal socket 28, to seat the stop piece 94 in the female cylindrical holding socket 96; the wire 79 thereafter extends through the axial bores of successive links 80, end piece 70 and end extension 75 and is secured in the latter by the set screw 77. In the removal operation, the removal socket 28 is inserted through the tube 12, utilizing the necessary number of links 80 to position the removal socket 28 over the wedge nut 54. By clockwise rotation of the power drive device 22 operating through end piece 70 and link mechanism 24, the removal socket 28 is threaded onto the threaded portion 46 of mandrel 40, to a secure position. The link mechanism 24 is then inserted further into tube 12, to advance the mandrel 40 axially relatively to gripper 30. If required, link mechanism 24 may be hit at its free end (e.g. on end extension 75), to "free" tapered portion 43 of the mandrel head from the surface 33 of the end portion 32 of gripper 30 (in the event it remains frictionally engaged therewith). With reference to FIGS. 1A and 1B, pin 49 moves axially to the left, along and relatively to the longitudinal leg of slot 37. Thereafter, mandrel 40 is rotated in a clockwise direction through link mechanism 24, causing pin 49 to be received in a locked position in the transverse leg of slot 37. The link mechanism 24 then may be used to pull the device 10 from the tube 12, pin 49 assuring that the gripper 30 is not inadvertently engaged and expanded by the mandrel 40 and instead remains free to slide through the tube 12.

The link mechanism 24 and removal socket 28 thus permit convenient removal of the device 10 from a remote position within tube 12. It will be appreciated that if tube 12 is removed from the steam generator and cut into a segment affording an open end adjacent the wedge assembly 50, that the wedge nut 52 then is directly accessible, whereby the foregoing operations for releasing and removing the device 10 can be performed without use of the link mechanism 24.

While the foregoing discloses a preferred embodiment of the tube protection device and related installation device of the invention and the method of using same, numerous adaptations and modifications of the invention will be apparent to those of skill in the art and thus it is intended by the appended claims to cover all such modifications and adaptations which fall within the true spirit and scope of the invention.

I claim as my invention:

1. Apparatus for protecting a region of a hollow tube, having interior and exterior wall surfaces and an open end, from deformation during withdrawal of the tube through an aperture in a support structure which frictionally engages the exterior wall surface of the tube, the interior wall surface of the tube having a predetermined diameter, comprising:

a generally cylindrical device of a metallic material and of a fixed, predetermined axial length and having first and second opposite ends, said device being insertable, beginning at said first end, fully into the tube to a predetermined position therein at which said first and second opposite ends of said device are contiguous to respective portions of the interior wall surface of the tube and span, therebetween, the region of the tube to be protected from deformation, said device comprising first and second gripper portions disposed at the corresponding, said first and second opposite ends of said device, said gripper portions defining the maximum diameter of the device and being elastically expansible from a first, relaxed condition, of a first outer diameter less than the predetermined diameter and thereby displaced from the interior wall surface of said tube during said insertion, to a clamped condition of a second outer diameter greater than the predetermined diameter at said predetermined position of said device and thereby releasably and frictionally engaging the respective, said contiguous portions of the interior wall surface of the tube, and an actuator comprising a first portion extending coaxially through said generally cylindrical device and having a first end disposed contiguous to the first end of said device and a second end extending outwardly from the second end of said device, and a second portion received on and rotatably relatively to the second end of the first portion, the actuator being operable through rotation of the second portion thereof, relatively to the first portion, in a first sense for actuating said first and second gripper portions to expand substantially simultaneously from said relaxed condition to said clamped condition and operable through rotation in a second, opposite sense to permit said first and second gripper portions to contract from said clamped condition to said relaxed condition;

an adjustable length mechanism, insertable into the tube from the open end thereof and comprising first and second ends, the mechanism being selectively connectable at its first end with said actuator for inserting the device into the tube to the predetermined position with the second end extending exteriorly of the open end of the tube and adapted for being driven at its second end selectively in rotation, and correspondingly, selectively rotating said second portion of said actuator in said first and second, opposite senses; and a holding device, disposed coaxially within and extending through said adjustable length mechanism and having a first end selectively connectable with the second end of the first portion of the actuator, the holding device having a second end at the exterior of the open end of the tube and being adapted for being restrained against rotation at its second end and correspondingly restraining the first portion of the actuator against rotation during selective rotation of the second portion of the actuator by the adjustable length mechanism.

2. Apparatus as recited in claim 1, wherein:

said device comprises a hollow sleeve of generally elongated cylindrical configuration having interior and exterior wall surfaces and said first and second gripper portions comprise opposite end portions of said sleeve configured to permit elastic expansion and contraction thereof between said relaxed and clamped conditions;

said first portion of said actuator comprises an elongated mandrel received within said sleeve, the first end thereof mating with the interior wall surface of the corresponding said first gripper portion and said second end thereof comprising a drive engaging portion and an externally threaded portion extending from said drive engaging portion toward said corresponding second gripper portion; and said second portion of said actuator comprising a wedge having a surface at a first end thereof disposed toward said second gripper portion for engaging the interior of said second gripper portion and a drive engaging portion at the opposite end thereof, said wedge being received in threaded relation on said externally threaded portion of said second end of said mandrel and selectively rotatable thereabout for selective axial displacement along said mandrel in first and second opposite directions in accordance with selective rotation of said wedge, relative to said mandrel, in corresponding first and second opposite senses; and said first end of said adjustable length mechanism selectively engaging said drive engaging portion of said wedge.

3. Apparatus as recited in claim 2, further comprising:

means for restraining the second end of said holding device against rotation.

4. Apparatus as recited in claim 3, wherein:

said link mechanism has an axial bore extending therethrough; and said holding device comprises a wire extending coaxially through said axial bore in said link mechanism.

5. A tube protection device for protecting a defect region of a hollow tube, having interior and exterior wall surfaces and an open end, from deformation as a result of a longitudinal pulling force exerted on the tube when withdrawing same through an aperture in a structure which frictionally engages the exterior wall surface of the tube, the interior wall surface of the tube having a predetermined diameter, comprising:

a gripper of a metallic material and generally cylindrical, hollow configuration, having a central portion of a predetermined, fixed axial length sufficient to span the defect region, adapted for insertion fully within the tube to a predetermined position with the central portion spanning the defect region and having integral, opposite end portions defining the maximum diameter of the device, each end portion including an outer engaging surface and an interior, inwardly tapered receiving surface and being elastically expansible in a diametrically outward direction from a first outer diameter less than the predetermined diameter to a second outer diameter greater than the predetermined diameter;

a mandrel having a central elongated portion of approximately the same axial length as said gripper, a first integral end portion having an outwardly tapered surface corresponding to the inwardly tapered receiving surface of each of said gripper end portions, and a second integral end portion of generally cylindrical configuration including a drive engaging section at the free end thereof and a threaded section intermediate said drive engaging section and said central elongated portion;

a wedge assembly including a wedge portion having an outwardly tapered surface corresponding to the inwardly tapered receiving surface of each of said gripper end portions and a drive engaging portion, said drive engaging portion being threaded interiorly for engagement with said threaded section of said second integral end portion of said mandrel;

said tube protection device being assembled, with said mandrel received in coaxial relationship within said gripper and said wedge assembly in threaded engagement on said threaded section of said second integral end portion of said mandrel, for insertion fully into the tube to the predetermined position therein at which said gripper end portions are contiguous to respective portions of the interior wall surface of the tube and span, therebetween, the defect region, said wedge assembly being rotatable at said drive engaging portion thereof in a first sense relative to said mandrel for advancing along the mandrel axis and engaging said tapered surface of said wedge portion thereof and said tapered surface of said first end portion of said mandrel with the respective tapered surfaces of said corresponding end portions of said gripper, thereby to expand said gripper end portions from said first and toward said second outer diameter and cause said engaging surfaces thereof to firmly engage the respective, said contiguous portions of the interior wall surface of the tube and thereby clamp said tube protection device within the tube; and being rotatable at said drive engagement portion thereof in a second sense, opposite to said first sense, relative to said mandrel for being withdrawn along the mandrel axis and thereby releasing said tapered surfaces of said wedge portion thereof and of said first end portion of said mandrel from engagement with the corresponding tapered surfaces of said corresponding end portions of said gripper, said gripper end portions retracting elastically when released from engagement with said corresponding tapered surfaces of said wedge portion of said wedge assembly and said mandrel thereby to disengage and be released from the respective, said contiguous portions of the interior wall surface of the tube;

an installation tool for selectively engaging said drive engaging portion of said wedge assembly and said drive engaging section of said mandrel, comprising a generally cylindrical drive socket assembly adapted for insertion within the tube and comprising a first drive socket portion for being received over and engaging said drive engaging portion of said wedge assembly and having a coaxial, interior recess therein and a coaxial bore therethrough, and a holding socket received within said interior recess of said drive socket assembly and free for rotation relatively to said drive socket portion, for being received over and engaging said drive engaging section of said mandrel, a link assembly for insertion through, and of a length to extend from, the open end of the tube into connection with said drive socket assembly for driving said drive socket portion thereof selectively in rotation in said first and second opposite senses, and having a central bore extending throughout the length thereof, and a wire, having first and second ends, connected nonrotatably at said first end to said holding socket and extending coaxially through said respective central bores in said drive socket assembly and said link assembly to position said second end of said wire at the exterior of the open end of the tube; and means disposed at the exterior of the open end of the tube for engaging said second end of said wire to prevent rotational movement thereof and thereby restrain said holding socket and said mandrel against rotation during rotation of said drive socket portion of said drive socket assembly, and for engaging and selectively rotating said link assembly thereby to rotate said wedge assembly relatively to said mandrel selectively in said first and second opposite senses for correspondingly, selectively advancing and withdrawing said wedge assembly along the mandrel axis.

6. A tube protection device as recited in claim 5, wherein:

said link assembly comprises a plurality of links, each said link being elongated and receivable in the tube in parallel axial relationship, and having male and female cylindrical socket elements on the respective opposite ends thereof with the axes thereof transverse to the link axis, successive said links being pivotally interconnected by the corresponding male and female socket elements and conveying rotational force about the longitudinal axes of successive said links of said linkage assembly from the exterior of the open end of the tube to said drive socket assembly.

7. Apparatus for protecting a defect region of a hollow tube, having interior and exterior wall surfaces and an open end, from deformation during withdrawal of the tube through an aperture in a support structure which frictionally engages the exterior wall surface of the tube, the interior wall surface of the tube having a predetermined diameter, comprising:

a tube protection device comprising a gripper of metal and of a generally cylindrical, hollow configuration adapted to be inserted fully within the tube for positioning at the defect region and having a central portion of a fixed, predetermined axial length sufficient to span the defect region and integral, opposite end portions defining the maximum diameter of the device, each end portion including an outer engaging surface and an interior, inwardly tapered receiving surface and being elastically expansible in a diametrically outward direction from a first outer diameter less than the predetermined diameter to a second outer diameter greater than the predetermined diameter; a mandrel having a central elongated portion of approximately the same axial length as said gripper, a first integral end portion having an outwardly tapered surface corresponding to the inwardly tapered receiving surface of each said gripper end portions, and a second integral end portion of generally cylindrical configuration including a drive engaging section at the free end thereof and a threaded section intermediate said drive engaging section and said central elongated portion; a wedge assembly including a wedge portion having an outwardly tapered surface corresponding to the inwardly tapered receiving surface of each of said gripper end portions and a drive engaging portion, said drive engaging portion being threaded interiorly for engagement with said threaded section of said second integral end portion of said mandrel; said tube protection device being assembled, with said mandrel received in coaxial relationship within said gripper and said wedge assembly in threaded engagement on said threaded section of said second integral end portion of said mandrel, for insertion fully into the tube to a position therein at which said outer engaging surfaces of said end portions of said device are contiguous to respective portions of the interior wall surface of the tube and span, therebetween, the defect region of the tube, said wedge assembly being rotatable at said drive engaging portion thereof in a first sense relative to said mandrel for advancing along the mandrel axis and engaging said tapered surface of said wedge portion thereof and said tapered surface of said first end portion of said mandrel with the respective tapered surfaces of said corresponding end portions of said gripper, thereby to expand said gripper end portions substantially simultaneously and cause said engaging surfaces thereof to firmly engage the respective, said contiguous portions of the interior wall surface of the tube and thereby clamp said tube protection device within the tube, said wedge assembly being rotatable at said drive engaging portion thereof in a second sense, opposite to said first sense, relative to said mandrel for being withdrawn along the mandrel axis and thereby releasing said tapered surfaces of said wedge portion thereof and of said first end portion of said mandrel from engagement with the corresponding tapered surfaces of said corresponding end portions of said gripper, and said gripper end portions retracting elastically when released from engagement with said corresponding tapered surfaces of said wedge portion of said wedge assembly and said mandrel thereby to disengage and be released from the respective, said contiguous portions of the interior wall surface of the tube;

an installation tool for selectively engaging said drive engaging portion of said wedge assembly and said drive engaging section of said mandrel, comprising a generally cylindrical drive socket assembly adapted for insertion within the tube and comprising a first drive socket portion for being received over and engaging said drive engaging portion of said wedge assembly and having a coaxial, interior recess therein and a coaxial bore therethrough, and a holding socket received within said interior recess of said drive socket assembly and free for rotation relatively to said drive socket portion for being received over and engaging said drive engaging section of said mandrel, a link assembly for insertion through, and of a length to extend from, the open end of the tube into connection with said drive socket assembly for driving said drive socket portion thereof selectively in rotation in said first and second opposite senses, and having a central bore throughout the length thereof, a wire, having first and second ends, connected nonrotatably at said first end to said holding socket and extending coaxially through said respective central bores in said drive socket assembly and said link assembly to position said second end of said wire at the exterior of said open end of the tube; and means disposed at the exterior of the open end of the tube of engaging said second end of said wire to prevent rotational movement thereof and thereby restrain said holding socket and said mandrel against rotation during rotation of said drive socket portion of said drive socket assembly, and for engaging and selectively rotating said link assembly thereby to rotate said wedge assembly relatively to said mandrel selectively in said first and second opposite senses for correspondingly advancing and withdrawing said wedge assembly along the mandrel axis.

8. Apparatus as recited in claim 7, wherein:

said link assembly comprises a plurality of links, each said link being elongated and receivable in the tube in parallel axial relationship, and having male and female cylindrical socket elements on the respective opposite ends thereof with the axes thereof transverse to the link axis, successive said links being pivotally interconnected by the corresponding male and female socket elements and conveying rotational force about the longitudinal axes of successive said links of said link assembly from the exterior of the open end of the tube to said drive socket assembly.

* * * * *